Patented May 8, 1934

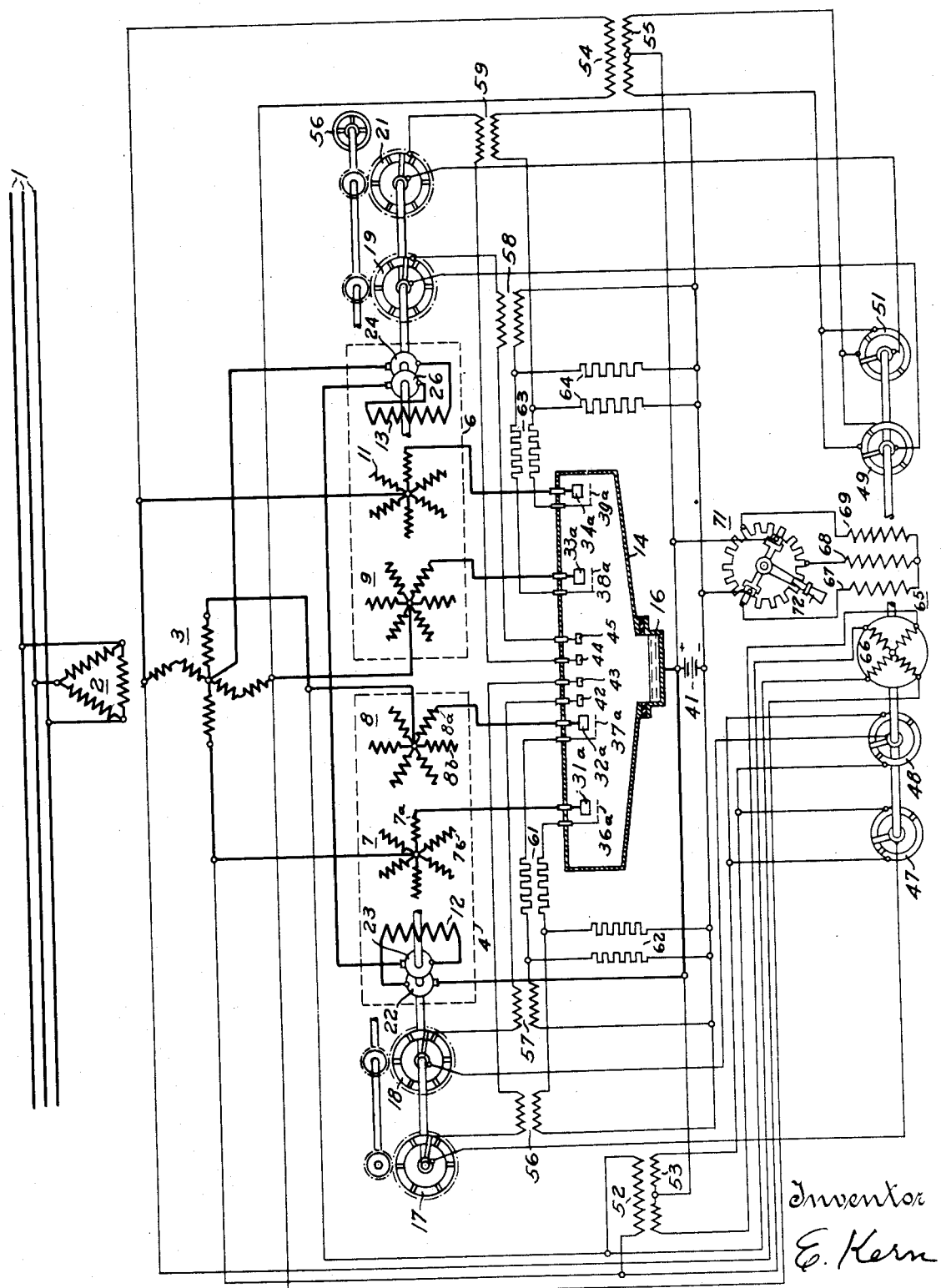

1,958,365

UNITED STATES PATENT OFFICE 1,958,365

MOTOR CONTROL SYSTEM

Erwin Kern, Ennetbaden, Switzerland, assignor to Aktiengesellschaft Brown Boveri & Cie., Baden, Switzerland, a joint-stock company of Switzerland Application August 26, 1932, Serial No. 630,540
In Germany August 27, 1931

12 Claims. (Cl. 172—274)

This invention relates to improvements in control means for variable speed alternating current electric motors and more particularly to motors not provided with commutators.

Where it is desired to operate variable speed alternating current commutator motors from a polyphase line it is also generally desired to load each phase of the supply line equally. Such loading can be attained by the use of three phase motors but single phase motors may be preferred on account of certain peculiarities in their characteristics. To load the different phases of the supply line equally it is then necessary to simultaneously operate a plurality of motors each connected with one of the phases of the supply line and so arranged as to draw equal amounts of energy from each phase of the line. If it is desired to use only one single phase motor it is possible to attain the desired equality of loading by the use of two motors of lower rating mounted on the same shaft or otherwise mechanically connected and connected with the supply line through a transformer provided with a two phase secondary, each motor then being connected to one secondary phase of the transformer. For a variable speed operation it is usual to utilize commutator motors, starting and speed regulation then being obtained by brush shifting. It is well known, however, that alternating current commutator motors have certain limitations in regard to output and to impressed voltage in addition to which it is difficult to force two such motors to take equal loads merely by brush shifting on account of the variable characteristics of their magnetic circuits. The disadvantage inherent in such motors can be avoided by utilizing motors without commutators, of the so-called synchronous type, and by controlling such motors by means of a single electric valve.

It is, therefore, among the objects of the present invention to provide a control system for operating a group of two single phase alternating current motors without commutators from a polyphase supply line.

Another object of the invention is to provide a control system for two single phase alternating current motors without commutators in which the armature energizations are controlled by a single electric valve or rectifier.

Another object of the invention is to provide a control system for two single phase alternating current motors without commutators, the control system being of such a nature as to equalize the loads drawn by the two motors from each phase of a polyphase alternating current supply line.

Another object of the invention is to provide a control system for two single phase alternating current motors without commutators which system will provide for variable speed operation of said motors.

Another object of the invention is to provide a control system for two single phase alternating current motors without commutators in which system the starting current of the motors is limited without the use of any switching device.

Another object of the invention is to provide a control system for two single phase alternating current motors without commutators in which system the motors may be reversed without the use of switching devices.

Another object of the invention is to provide a control system for two single phase alternating current motors without commutators which system permits regenerative braking operation of said motors.

Another object of the invention is to provide a control system for two single phase alternating current motors without commutators which system is applicable for operation of said motors at voltages higher than could be used in conjunction with commutator motors.

Objects and advantages other than those above set forth will be apparent from the following description when read in connection with the accompanying drawing which diagrammatically illustrates one embodiment of the invention.

Referring more particularly to the drawing by characters of reference the reference numeral 1 designates a polyphase alternating current supply line shown as a three phase line, such three phase lines being most commonly used in practice. The three phase primary winding 2 of the transformer having a two phase secondary winding 3 is connected with the supply line 1. One phase of winding 3 is connected with the stator or armature windings 7, 8 of a motor 4 also provided with a rotor field winding 12 connected with the transformer secondary winding 3 by means of slip rings 22 and 23. The other phase of winding 3 is likewise connected to the armature windings 9, 11 of a motor 6 provided with a field winding 13 and slip rings 24 and 26. The fields of the two motors are mounted on the same shaft or may be otherwise mechanically connected so as to insure their operation at identical speeds. Motor 4 is provided with two distributors 17 and 18 and motor 6 is likewise provided with distributors 19 and 21 the purpose of which will appear hereinafter. Each of the distributors comprises a rotating brush mounted in insulated relation on the corresponding motor shaft and arranged for sequentially making contact with a plurality of segments. The segments of the distributors are movably supported on the frame of the motors by suitable means permitting an adjustment of their position with respect to the motor frame by means including the shaft and wheel 56.

The flow of operating current to the motors 4, 6 is regulated by means of an electric valve 14 shown as a rectifier of the metallic vapor arcing type provided with a plurality of groups of anodes 31, 32, 33, 34 of which only one anode 31a, 32a, 33a, 34a of each group is shown and with a cathode 16. In the embodiment shown each phase of winding 3 is connected with the neutral point of one of windings 7, 8, 9 or 11, and each portion of windings 7, 8, 9 and 11, terminates at one of the anodes of rectifier 14. The circuit through which the operating current flows is completed from cathode 16 to slip ring 22, field 12, slip ring 23, slip ring 26, field 13, slip ring 24 to the neutral point of winding 3. For the purpose of controlling the flow of current in rectifier 14 each of the anodes thereof is provided with one of a group of control electrodes as at 36, 37, 38, 39. Each control electrode is energized, when flow of current through the corresponding anode is not desired, at a negative potential from battery 41 connected with cathode 16 of rectifier 14. Such current flows from battery 41 through one of a plurality of resistances 62 and through one of a plurality of resistances 61 or through resistances 64 and 63. Motor 4 is provided with a transformer 52, 53 connected with the phase of the winding 3 to which windings 7, 8 are connected which transformer energizes a pair of auxiliary anodes 42, 43 in rectifier 14 through a pair of auxiliary distributors 47 and 48, distributors 17 and 18 and a plurality of series transformers of which only two are shown at 56 and 57. The secondary windings of transformers 56 and 57 are connected across resistances 62 for the purpose of impressing upon control electrodes 36 and 37, voltage impulses in response to the operation of anodes 42 and 43 for the purpose of controlling the current in anodes 31 and 32. Distributors 47 and 48 each comprise a pair of fixed segments connected with transformer secondary winding 53 and in contact with brushes driven by a synchronous motor 65 energized from winding 3. The magnetic field induced in rotor armature 66 of motor 65 by the windings thereof rotates at the rate of one revolution for each cycle of the supply line voltage with respect to the armature, and is therefore stationary in space in a predetermined angular relation with the stator field winding. To permit adjustment of the relative position of the armature magnetic field and of the stator field winding such winding is divided into three portions 67, 68, 69 distributed about the periphery of the motor stator. The field winding portions are connected with the circular rheostat 71 and energized therethrough from battery 41. Manual adjustment of a lever 72 permits a variable energization of winding 67, 68, 69 which determines the relative position taken by the magnetic field of the armature with respect to the stator, and therefore the position of armature 66 during each cycle of the voltage of line 1.

A duplicate control is provided for motor 6 comprising transformer 54, 55, auxiliary anodes 44 and 45, series transformers 58, and 59 and auxiliary distributors 49 and 51, the latter being mounted with distributors 47 and 48 on the shaft of motor 65.

In operation, the rotors of motors 4 and 6 rotate in such manner as to produce, in the different circuits, a constantly recurring cycle of operations to be now particularly described. When the motors and the control equipment are in the position shown and line 1 is energized, assume that motors 4 and 6 are still at rest and that auxiliary motor 65 is rotating at synchronous speed and in the position shown at the instant at which the conditions in the several circuits now will be considered. If it is assumed that the voltage of line 1 at the particular moment considered is such as to induce a positive half wave in the phase of winding 3 connected with armature 7, the positive voltage will likewise be impressed on transformer primary winding 52 and, from its secondary 53, through distributors 47 and 17, through transformer 56, auxiliary anode 43, cathode 16, back to transformer secondary winding 53. The operation of anode 43 causes a voltage surge to be transmitted by means of transformer 56 across resistance 62 to control electrode 36a. Such surge, for a short period of time, overcomes the negative voltage impressed thereon by battery 41 and thus brings control electrode 36a to a potential higher than that of cathode 16. The voltage impressed on winding 7a and anode 31a by winding 3 being positive at the instant considered, the anode is in condition to function and current flows from winding 3 through winding portion 7a, anode 31a, cathode 16, field windings 12 and 13, back to winding 3. Such current will flow during a period of one-half cycle after which the voltage impressed on winding 7 becomes negative and the flow of current ceases. At the end of the one-half cycle motor 65 will have accomplished one-half revolution and the voltage impressed on winding 8 will be positive. The voltage impressed on transformer 52, 53 will be reversed and winding 53 will now energize auxiliary anode 42 through the circuit including winding 53, distributor 48, distributor 18, transformer 57, anode 42, cathode 16 back to winding 53. By a process similar to that described above transformer 57 impresses a positive voltage on control electrode 37a of anode 32a as a current flows from winding 3 to winding 8a, anode 32a, cathode 16, field windings 12 and 13, back to winding 3. It will be seen that, as long as motor 4 remains in the position shown, windings 7a and 8a will be energized alternately once for every cycle of the supply line voltage. The flow of current through windings 7, 8 and through field winding 12 produces a torque which causes field 12 to rotate thereby causing rotation of the brushes of distributors 17 and 18. When the brush of the distributor 17 passes from one segment to the next it will no longer permit positive energization of control electrode 37a and, therefore, no longer permits operation of anodes 32a. It then permits positive energization of the next electrode controlling the anode connected with winding 7b so that the flow of current then alternates between windings 8a and 7b. Further rotation of the motor causes the flow of current to alternate between windings 7b and 8b, the portions of windings 7 and 8 which receive current always being automatically so selected as to produce a torque on the field 12.

If it is desired to reduce the average voltage received by windings 7, 8 from winding 3, lever 72, is so adjusted as to cause the rotor of motor 65 to lag behind the stator rotating field. The connection of auxiliary anodes 42 and 43 to transformer 52, 53 is then no longer established at the beginning of each half cycle but is retarded by distributors 47 and 48. The flow of current in windings 7, 8 which is subsequent to the flow of current in anodes 42 and 43 is, therefore, delayed for a portion of each half wave so that the average current received by motor 4 becomes smaller dependent on the amount of lag given to the rotor of motor 65.

The operation above described for motor 4 is also applicable to motor 6 in which windings 9, 11 are connected with the second phase of winding 3 to which is also connected control transformer 54, 55. The control is obtained through two auxiliary distributors 49 and 51, having their segments displaced with respect to those of distributors 47 and 48 by an angle of 90° to take into account the difference of phase of the voltages impressed on the two motors.

It will be seen that the current circulating in field winding 12 or 13 is drawn simultaneously from one of the windings 7 or 8 and one of the windings 9 or 11 and is smoothed out by the inductance of the fields 12 or 13 so that it can be considered as being substantially direct current.

The amount of current drawn by motors 4 and 6 is dependent upon the average voltage impressed on said motors by the action of winding 3 modified by distributors 47, 48, 49 and 51. The motors being connected in series as shown, the speed depends upon the amount of current they receive so that the voltage control given due to the distributors is also a speed control. The speed can also be regulated by shifting the position of the segments of distributors 17, 18, 19 and 21, by means including the shaft and hand wheel 56, with the result that, in each motor, the field produces a torque with an armature winding. By moving wheel 56 so as to displace the segments of the distributors by 180 electrical degrees, the energized portions of windings 7, 8, 9 and 11 will produce, with fields 12 and 13, a torque in a reverse direction and the motors will thus be reversed without switching operations in the main circuits.

If motor 65 is made to lag by an angle greater than 180 electrical degrees, control electrodes 36, 37, 38 and 39 will permit current to flow in windings 7, 8, 9 and 11, only when the latter are energized negatively. With distributor 17, 18, 19 and 21, in the position shown no current will flow in the motors which will thus idle if they were originally in motion. By moving wheel 56 by 180 electrical degres, the control electrodes will release the portions of the armature windings in which the back E. M. F. is negative instead of positive as was described above during that portion of each cycle during which the back E. M. F. of the windings is greater than the negative voltage impressed by winding 3 on the anodes of the rectifier and such anodes will again be positive with respect to the cathode and current will flow in the motor in the same direction. The windings receiving current now however being 180° out of phase with the windings considered in normal operation they produce, in cooperation with the field, a torque which tends to retard the motors while energy is being returned to the supply line thereby producing a regenerating operation. The intensity of current flow during regeneration is controlled in the same manner as in normal operation by adjusting the lag of motor 65 by means of rheostat 71 and lever 72.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a motor control system, a plurality of motors each having stator and rotor windings and to be equally loaded and operated at the same speeds, a supply line, a transformer connecting the stator windings of said motors with said supply line, an electric valve connecting and controlling the flow of current through the stator and the rotor windings of said motors, and means controlling the flow of current through said electric valve.

2. In a motor control system, a plurality of single phase motors each having stator and rotor windings and to be equally loaded and operated at the same speeds, a polyphase alternating current supply line, a transformer connecting the stator windings of said motors with said supply line, an electric valve connecting and controlling the flow of current through the stator and the rotor windings of said motors, and means controlling the flow of current through said electric valve.

3. In a motor control system, a plurality of motors each having stator and rotor windings and to be equally loaded and operated at the same speeds, a supply line, a transformer having a polyphase primary winding and a two phase secondary winding connecting the stator windings of said motors with said supply line, an electric valve of the arcing type having anodes and a cathode and controlling the flow of current through the stator and rotor windings of said motors, and means controlling the flow of current through said electric valve.

4. In a motor control system, a plurality of single phase motors each having stator and rotor windings and to be equally loaded and operated at the same speeds, a polyphase alternating current supply line, a transformer having a polyphase primary winding and a two phase secondary winding connected to provide a neutral point, said transformer connecting the stator windings of said motors with said supply line, an electric valve of the arcing type having anodes connected with the several portions of the secondary winding of said transformer and a cathode connected with the neutral point thereof to control the flow of current through the said stator and rotor windings, and means controlling the flow of current through said electric valve.

5. In a motor control system, single phase motors each having a plurality of stator windings with neutral points and a rotor winding, a polyphase supply line, a transformer having a primary winding connected with said supply line and having a two phase secondary winding connected to form a neutral point, the neutral points of the stator windings being connected with the terminals of the secondary winding and the neutral point of the secondary winding being connected with the rotor windings, an electric valve of the arcing type connecting the stator and rotor windings, and means controlling the flow of current through said valve.

6. In a motor control system, single phase motors each having, a plurality of stator windings with neutral points and a rotor winding, a polyphase supply line, a transformer having a primary winding connected with said supply line and having a two phase secondary winding connected to form a neutral point, the neutral points of the stator windings being connected with the terminals of the secondary winding and the neutral point of the secondary winding being connected with the rotor windings, an electric valve of the arcing type having anodes and a cathode, the terminals of the stator windings being connected with the anodes and the rotor windings being connected with the cathode, and means controlling the flow of current through said valve.

7. In a motor control system, a plurality of single phase motors each having stator and rotor windings without commutators to be equally loaded and operated at the same speed, a polyphase supply line, a transformer connecting the stator windings of said motors with said supply line, the rotor windings of said motors being connected with said transformer, an electric valve of the arcing type having anodes and control electrodes and a cathode, said valve connecting the stator and the rotor windings of said motors, a source of E. M. F. connected with the control electrodes and the cathode, and means connected with the control electrodes and with said source to control the flow of current through said valve.

8. In a motor control system, a plurality of single phase motors each having stator and rotor windings without commutators to be equally loaded and operated at the same speed, a polyphase supply line, a transformer connecting the stator windings of said motors with said supply line, the rotor windings of said motors being connected with said transformer, an electric valve of the arcing type having anodes and control electrodes and a cathode, said valve connecting the stator and the rotor windings of said motors, a source of E. M. F. connected with the control electrodes and the cathode, and distributors associated with the rotors of said motors and connected with the control electrodes and with said source to permit cyclic operation of the anode of said valve.

9. In a motor control system, a plurality of single phase motors each having stator and rotor windings without commutators to be equally loaded and operated at the same speed, a polyphase supply line, a transformer connecting the stator windings of said motors with said supply line, the rotor windings of said motors being connected with said transformer, an electric valve of the arcing type having anodes and control electrodes and a cathode, said valve connecting the stator and the rotor windings of said motors, a source of direct current E. M. F. connected with the control electrodes and the cathode, distributors associated with the rotors of said motors and connected with the control electrodes and with said source, and means connected with said supply line and with said distributors to superpose an alternating current E. M. F. on the direct current E. M. F. supplied from said source to permit cyclic operation of the anodes of said valve.

10. In a motor control system, a plurality of single phase motors each having stator and rotor windings without commutators to be equally loaded and operated at the same speed, a polyphase supply line, a transformer connecting the stator windings of said motors with said supply line, the rotor windings of said motors being connected with said transformer, an electric valve of the arcing type having anodes and control electrodes and a cathode, said valve connecting the stator and the rotor windings of said motors, a source of direct current E. M. F. connected with the control electrodes and the cathode, a plurality of distributors connecting said supply line and said source with the control electrodes, a portion of said distributors being operated by said motors, and means for operating the remainder of said distributors to permit cyclic operation of the anodes of said valve.

11. In a motor control system, a plurality of single phase commutatorless motors each having stator and rotor windings and to be equally loaded and operated at the same speed, a polyphase supply line, a transformer connecting the stator windings of said motors with said supply line, the rotor windings of said motors being connected with said transformer, an electric valve of the arcing type having anodes and control electrodes and a cathode, said valve connecting the stator and the rotor windings of said motors, a source of direct current E. M. F. connected with the control electrodes and the cathode, a plurality of distributors connecting said supply line and said source with the control electrodes, a portion of said distributors being operated by said motors, and a motor supplied with current from said line for operating the remainder of said distributors to permit cyclic operation of the anodes of said valve.

12. In a motor control system, a plurality of single phase commutatorless motors each having stator and rotor windings and to be equally loaded and operated at the same speed, a polyphase supply line, a transformer connecting the stator windings of said motors with said supply line, the rotor windings of said motors being connected with said transformer, an electric valve of the arcing type having anodes and control electrodes and a cathode, said valve connecting the stator and the rotor windings of said motors, a source of direct current E. M. F. connected with the control electrodes and the cathode, a plurality of distributors connecting said supply line and said source with the control electrodes, a portion of said distributors being operated by said motors, a motor having an armature winding supplied with current from said line and a field winding connected with and energized from said source of direct current E. M. F. for operating the remainder of said distributors, and means for varying the connections of the last said winding with the said source of direct current E. M. F. to vary the moments of the cyclic operation of each of the anodes to control the speed of the first said motors.

ERWIN KERN.